US005917300A

United States Patent [19]

Tanquary et al.

[11] Patent Number: 5,917,300

[45] Date of Patent: Jun. 29, 1999

[54] METHOD AND APPARATUS FOR THE CONTROL OF GANTRY MACHINES

[75] Inventors: Mark L. Tanquary, Needham, Mass.; Neil C. Singer, Armonk, N.J.; Bert Whitney Rappole, Jr., Manchester, N.H.

[73] Assignee: Convolve, Inc., New York, N.Y.

[21] Appl. No.: 08/928,367

[22] Filed: Sep. 12, 1997

Related U.S. Application Data

[60] Provisional application No. 60/040,256, Mar. 10, 1997.

[51] Int. Cl.[6] .............................. B66C 13/30; H02P 7/67

[52] U.S. Cl. .............................. 318/575; 212/284

[58] Field of Search .............................. 318/575; 212/284, 212/271; 364/474.36

[56] References Cited

U.S. PATENT DOCUMENTS 4,381,608 5/1983 Thormann et al. .

5,117,348 5/1992 Romero et al. .

*Primary Examiner*—Bentsu Ro

*Attorney, Agent, or Firm*—Choate, Hall & Stewart

[57] ABSTRACT

Control system for controlling a dynamic physical system. New, substantially decoupled axes are derived from physical axes of a dynamic system. Closed-loop controllers operate on signals representing the new or synthesized axes to control the coordinate parameters. Control signals are then converted into the original physical axes to generate signals to control the original axes. A preferred embodiment is the application of the control technique to a gantry machine having three degrees of freedom. Actual coordinates are converted to one linear coordinate and one rotational coordinate. The bandwidth of controllers operating on these two coordinates are separated so that crosstalk is diminished and performance improved.

4 Claims, 4 Drawing Sheets

BLOCK DIAGRAM OF COMBINED R AND THETA CONTROL LOOPS

FIG. 1 A TYPICAL GANTRY MACHINE CONFIGURATION
PRIOR ART
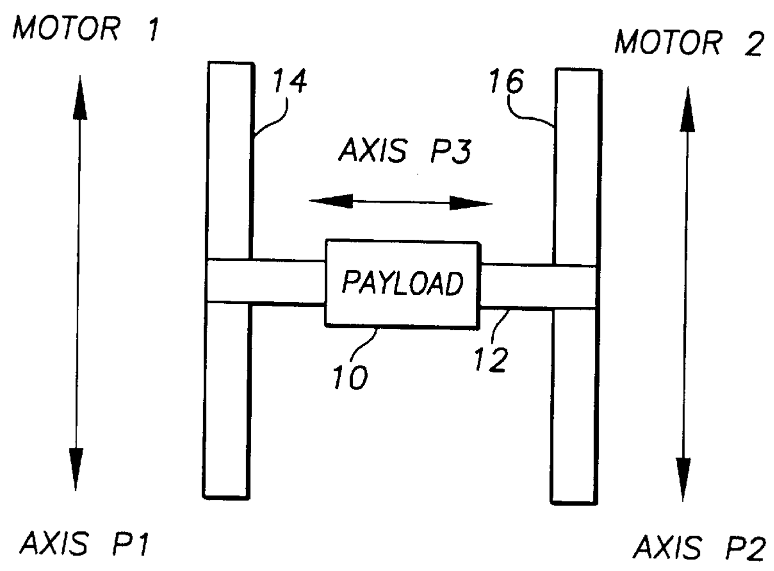
FIG. 2 THE GANTRY SYSTEM OF FIGURE 1 SHOWING NEW R- THETA COORDINATES
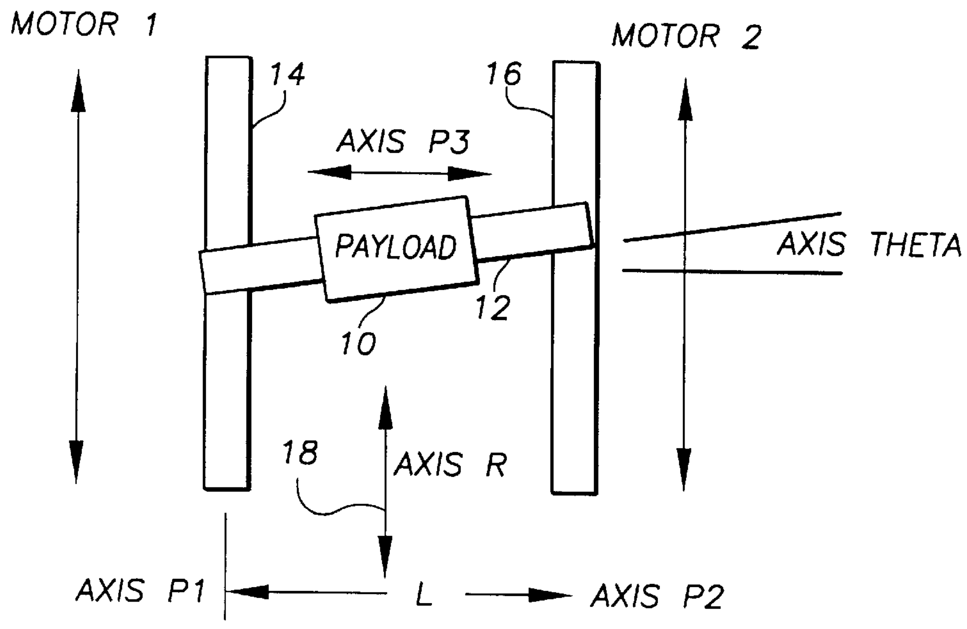

COMPUTING THE LOCATION OF THE CENTER OF GRAVITY OF THE COMBINED SYSTEM. ELEMENTS 10 AND 12

FIG. 4 APPLYING FORCES F1 AND F2

BLOCK DIAGRAM OF COMBINED R AND THETA CONTROL LOOPS

METHOD AND APPARATUS FOR THE CONTROL OF GANTRY MACHINES

This national application claims benefit of the priority of U.S. provisional application Ser. No. 60,040,256 filed Mar. 10, 1997 and entitled "Control of a Parallel Actuator Gantry Machine."

BACKGROUND OF THE INVENTION

Gantry machines are often used in industry for moving a payload over a large area. Typically a gantry machine includes a transverse member which is used to support a payload which may move along the transverse member or be fixed in location on the transverse member. The transverse member is supported on a pair of spaced apart longitudinal members defying a longitudinal direction. FIG. 1 shows a gantry machine as known in the prior art. A payload 10 rides on a transverse member 12 and moves along an axis labeled as Axis P3. The transverse member 12 is supported on spaced apart longitudinal members 14 and 16. Motors labeled motor 1 and motor 2 are provided to move the ends of the transverse member 12 to move the payload in the longitudinal direction. Thus, using currently available state-of-the-art technology, the gantry system shown in the FIG. 1 is controlled along three separate axes P1, P2 and P3. Physical axes P1 and P2, controlled by motor 1 and motor 2, are given the same command or used in a "master/slave" arrangement. In such an arrangement, P2 will blindly follow P1 in the "slave" mode. A problem with this prior art configuration is that the two axes P1 and P2 are similar or identical and use similar or identical controllers. Movements along any one of these axes is unknown to the other. Since these controlled axes have essentially the same bandwidth, proper movement along either P1 or P2 appears as a disturbance to the other axis. These two axes will therefore "crosstalk" to each other and cause poor performance.

A prior art solution is to detune the controllers so that P1 and P2 move relatively slowly and therefore tend not to disturb one another. Another option, as disclosed in U.S. Pat. No. 4,812,725 is to close the loop on only one motor, for example the motor on axis P1, and leave the motor controlling axis P2 in an open loop mode. In this case, a control loop operates on P1 and a motor command is generated for P2 so that it is proportional to P1. This configuration will eliminate the crosstalk between the two controllers but results in a loss of accuracy due to having two degrees of freedom and allowing one of these degrees of freedom to be uncontrolled. Essentially, the angle of the transverse member of the gantry is free to be any quantity limited only by the mechanical guidance provided by the transverse member. It is therefore desirable to have two closed-loop controllers for each of the axes P1 and P2 but nonetheless eliminate the disturbance crosstalk problem.

SUMMARY OF THE INVENTION

The present invention is based on a transformation from physical axes and coordinates to "fictitious" or synthesized coordinates which are substantially orthogonal to one another so as to decouple the controllers and minimize disturbances between the axes. Thus, according to one aspect of the invention the method for controlling a dynamic system having at least two original control axes includes deriving new, substantially decoupled axes having new coordinate parameters. Individual closed-loop controllers are applied to the new axes to control the parameters and these parameters are then converted into the original control axes to generate signals to control the original physical axes. This technique is referred to herein as R-Theta control. A preferred embodiment is a gantry system applying the control technique. In this embodiment, the individual closed-loop controllers have a separation in bandwidth. A first new coordinate, R, is a linear coordinate in the same direction as two of the physical axes. A second coordinate is a rotary coordinate, Theta, which is related to the difference between the linear coordinates P2 and P1.

The fundamental concept of the invention is to define two closed-loop controllers, one of which operates on the rotary or Theta coordinate and one of which operates on the linear or R coordinate. The Theta controller is made to have high bandwidth and a fast response while the R controller is designed to have a slower response. With such a configuration, disturbances in R do not affect Theta and disturbances in Theta do not affect R.

An advantage of the technique of the invention is that conventional controller cards are easily slightly modified in software to implement the R-Theta technique. In effect, the controllers are "fooled" into operating their built-in PID (proportional, integral, differential) controllers on two "fictitious" motors controlling the R and Theta coordinates. A software code segment generates the R and Theta feedback signals from three physical encoders responding along the P1, P2 and P3 axes (the P3 location may be fixed). After the PID loops run, software takes the R and Theta commands, intercepts them before they are physically output, and creates two new motor commands for the actual motors along axes P1 and P2. Additionally, in the gantry configuration, the Theta control loop becomes a regulator which is designed to hold a stable position while the R coordinate varies. Commercially available control cards that implement an industry standard PID algorithm are well suited as regulators. Regulators work to maintain a constant output and therefore do not have the added requirement of responding to setpoint changes.

BRIEF DESCRIPTIONS OF THE DRAWING

FIG. 1 is a cross-sectional view of a prior art gantry machine configuration.

FIG. 2 is a cross-sectional view of a gantry machine configuration illustrating new R-Theta coordinates.

DESCRIPTION OF THE PREFERRED EMBODIMENT

Figure 3:
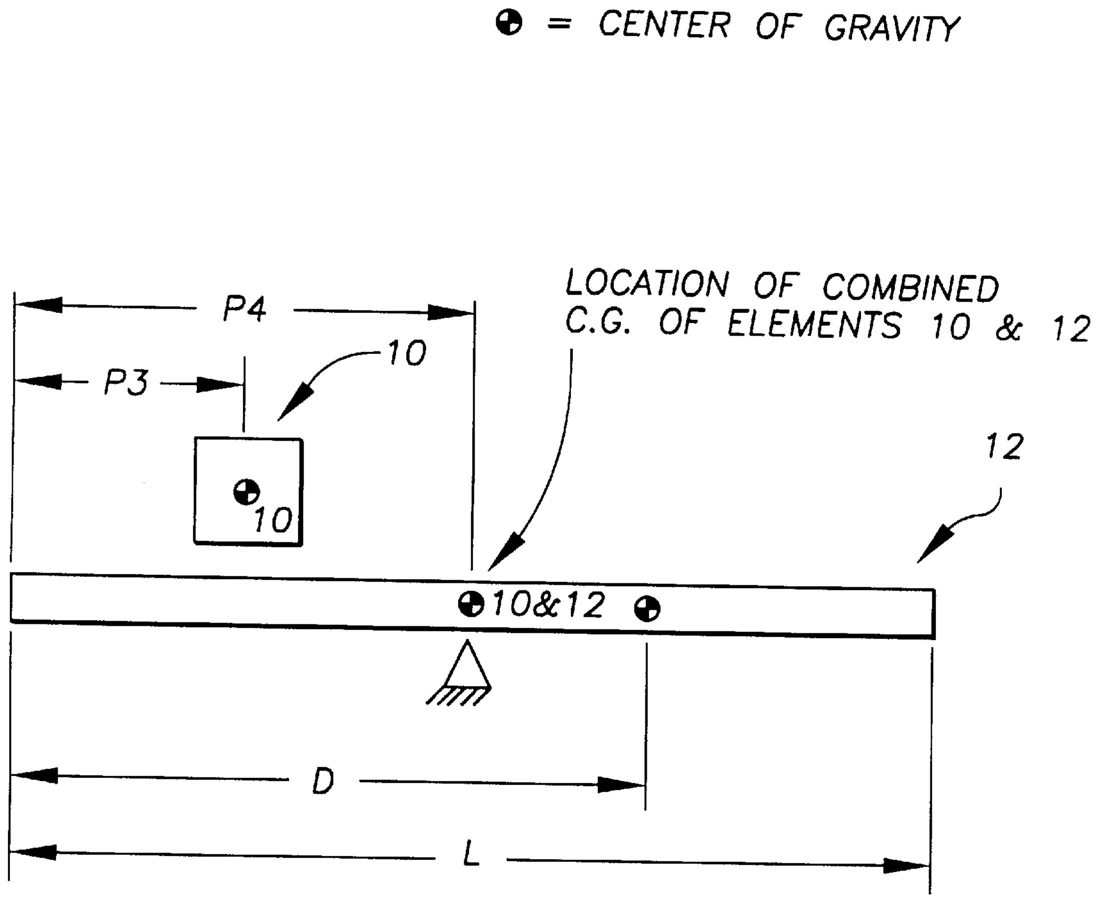
FIG. 3 is a schematic diagram illustrating computation of the center of gravity of gantry components.

As stated above, the present invention is based on the recognition that a change from real, highly coupled coordinates to synthesized, substantially decoupled coordinates can lead to improved performance by eliminating crosstalk when the bandwidth of a closed-loop controller about one of the new synthesized coordinates is separated from the bandwidth of the closed-loop controller controlling other coordinates. One important application of the present invention is the control of a gantry system such as the prior art gantry system shown in FIG. 1 and discussed earlier.

With reference now to FIG. 2, the transverse member 12 is oriented at an angle theta with respect to the longitudinal members 14 and 16. This angle theta will become one of the new coordinates. The center of mass of the payload 10 measured in the longitudinal direction is denoted by an axis R 18. In this embodiment, the longitudinal members 14 and 16 are separated by a distance L. The axis R becomes a second new coordinate.

To make the transformation from the original coordinate system, P1 and P2, to the new system, R and theta, requires that the new coordinates must be computed from a combination of P1, P2 and P3 as measured by, for example, encoders (not shown). As stated above, the P3 location may be fixed. The output from the new R and theta control loops must be apportioned to motor axes, M1 and M2, of motor 1 and motor 2 respectively, to decouple the actions of the new synthesized axes.

The feedback measurements for the new axes can be derived from the existing encoder measurements, P1, P2 and P3:

$$\text{theta}=\arctan((P2-P1)/L)$$

and for small angles: arctan (theta)~theta so that $$\text{theta}\sim((P2-P1)/L)$$

The selection of R coordinate depends on the intended application. If the objective is to position the moving payload 10, relative to a grid fixed in space beneath the gantry, the position R can be computed as:

$$R=P1+P3*\tan(\text{theta})$$

and again, since theta is small, tan (theta)~theta so:

$$R=P1+P3*\text{theta}$$

Substituting for theta from above:

$$R=(1-P3/L)*P1+(P3/L)*P2$$

If a new term, alpha, is defined which is the ratio of P3 to the length L or alpha=P3/L, then R can be computed as:

$$R=(1-\text{alpha})*P1+\text{alpha}*P2$$

For some applications, it may not be desirable to change the value of R as a function of P3 (for example when the gantry system is positioning a workpiece relative to a single point tool fixed in space). In this case the value for alpha may be fixed since both L and P3 are fixed.

Another issue is how to apportion the outputs from the R and theta control loops to reduce or eliminate the effects of the output from one control loop on the other control loop. To move elements 10 and 12 in the R direction without inducing a theta rotation, the forces must be applied so that the sum of torques acting about the center of gravity (CG) of the combined system of elements 10 and 12 is zero.

The location of the CG of the combined system of elements 10 and 12 can be calculated as shown in FIG. 3:

$$(P4-P3)*W10=(D-P4)*W12$$

where:

W10=mass of element 10

W12=mass of element 12 which can be simplified to:

$$P4=(W12/(W10+W12))*D+(W10/(W10+W12))*P3$$

The first term will be equal to a constant, but the second term will vary as function of position of the moving element 10 unless P3 is fixed.

To move the combined system of elements 10 and 12, forces F1 and F2 will be applied by motor 1 and motor 2. If forces F1 and F2 are applied so that the sum of the torques about the point P4 equals zero, then the combined system will move without rotation. The total force applied Ft=F1+F2. Ft will be the total force output calculated by the R control loop.

Figure 4:
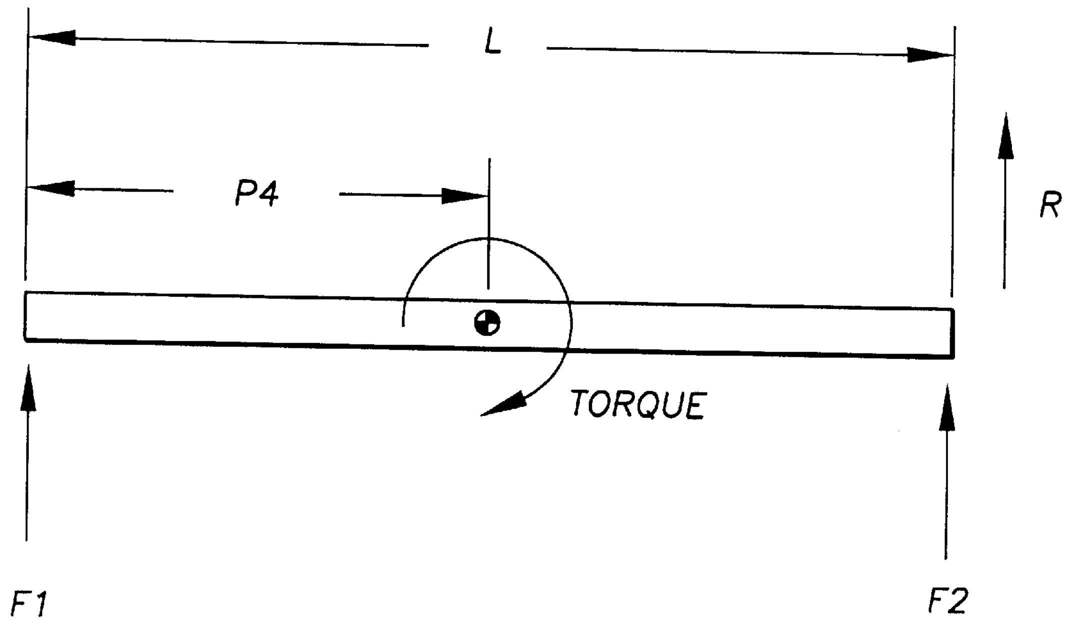
FIG. 4 is a schematic illustration showing the application of forces F1 and F2.

As can be seen in FIG. 4, summing the torques about P4:

$$F1*P4=F2*(L-P4)$$

which implies:

$$F2=F1*(P4/(L-P4))$$

and substituting for F2 in the equation Ft=F1+F2:

$$Ft=F1+F1*(P4/(L-P4))$$

This equation can be solved to show that:

$$F1=[1/(1+(P4/(L-P4))]*Ft$$

also $$F2=[(P4/(L-P4))/(1+(P4/(L-P4))]*Ft$$

This can be simplified by letting beta=(P4/(L−P4)) then:

$$F1=(1/(1+\text{beta}))Ft$$

and $$F2=(\text{beta}/(1+\text{beta}))Ft$$

Figure 5:
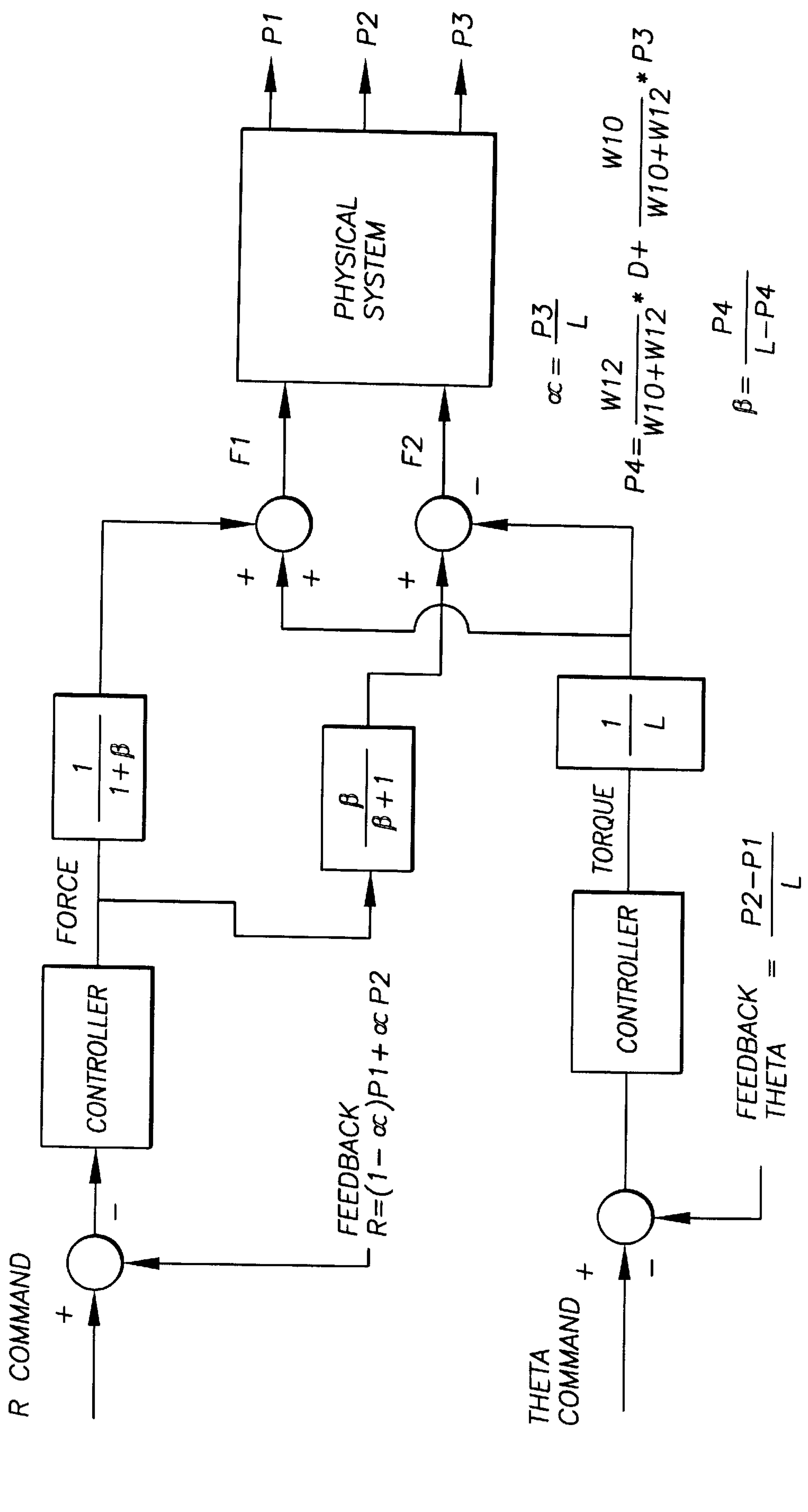
FIG. 5 is a block diagram of combined R and Theta control loops.

The output from the theta control loop will be a torque, T, which must be resolved into two forces F1 and F2 for command signals to the motors as shown in FIG. 5.

To avoid moving the transverse member 12 in the R direction when applying a torque, the sum of the forces in the R direction must equal 0 or:

$$F1+F2=0$$

This implies:

$$F2=-F1$$

The total torque applied by forces F1 and F2 will be:

$$T=F1*P4-F2(L-P4)$$

Substituting F2=−F1, $$T=F1*P4+F1*(L-P4)$$

which can be simplified to:

$$F1=T/L$$

and therefore $$F2=-(T/L)$$

By using superposition, the output values from the R and theta control loops can be linearly combined to satisfy the constraint that the two control loops do not interact when applying forces to the combined system of elements 10 and 12. The position feedback and appointment of the motor forces is shown in FIG. 5. The FIG. 5 block diagram implements the equations derived above.

In the embodiment just described, it will be apparent that the P3 value may vary as the payload 10 moves along the transverse member 12. Experimental results indicate, however, that acceptable performance results from an arbitrary selection of a fixed value for P3 such as, for example, ⅓ or ½ even when P3, in fact, is varying. The control system is rather insensitive to actual payload location.

The bandwidth of the Theta axis controller will be high for several reasons. First of all, the angle Theta will be small. Second, most of the payload mass is concentrated near the center of the gantry so that inertia about the Theta axis is small. Further, torques about the Theta axis are generated by motors operating along the axes P1 and P2 which are at the ends of the transverse member 12 thereby providing a long lever arm for effecting rotations about the Theta axis. These physical aspects all contribute to a high bandwidth about the Theta axis. In contrast, the bandwidth in the R direction will be lower because of the often considerable mass of the payload 10 which must be accelerated in the longitudinal direction. As discussed above, the separation in bandwidth between the R and Theta controllers substantially eliminates the crosstalk between the controllers resulting in better performance.

It will be appreciated by those skilled in the art that the present invention is applicable to a system in which there is no moving element along the transverse member. The equations derived above for center of gravity compensation still hold for such a static situation. The present invention will also work in the situation in which steps are taken to implement the exact equations derived above but in which the implementation is not perfect. For example, the load on the transverse member may move in some other direction that cannot be measured and fed back into the dynamic compensation of the center of gravity. It should also be recognized that the present invention may be implemented by utilizing velocity control loops around the motors instead of current or force control loops. The R and theta coordinates would be calculated using the same equations and the velocity set points to the motor controllers would be apportioned according to the same ratios. Such an implementation is effectively the same because the derivative of the velocity is the acceleration and force will be proportional to such acceleration.

While the present invention has been described in conjunction with its application to a gantry machine, it will be appreciated by those skilled in the art that the disclosed techniques have wider applicability and it is intended that all such applications be included within the scope of the appended claims.

What is claimed is:

1. Gantry control system comprising:

a gantry machine including a transverse member supporting a payload;

a pair of spaced apart structural members for supporting the transverse member;

first and second spaced apart longitudinal motors for moving the transverse member in a longitudinal direction substantially perpendicular to the transverse member;

a control system operating on a new coordinate system derived from the gantry machine coordinates, the new coordinate system including one linear coordinate representing the position of the payload in the longitudinal direction and one angular coordinate representing an angular deviation of the transverse member from perpendicular with respect to the longitudinal direction, the control system including a first closed-loop controller to control the linear coordinate to a commanded value and a second closed-loop controller to control the angular coordinate to a commanded value; and the control system further including means for converting the outputs of the first and second controllers into the gantry machine coordinates to generate signals to drive the first and second spaced apart longitudinal motors.

2. The gantry control system of claim 1 wherein the bandwidth of the first and second controllers are separated.

3. The gantry control system of claim 2 wherein the bandwidth of the closed-loop controller for controlling the angular coordinate is higher than the bandwidth of the closed-loop controller to control the linear coordinate.

4. The gantry control system of claim 1 further including a transverse motor for moving the payload along the transverse member.

* * * * *